United States Patent [19]
Yanai et al.

[11] Patent Number: 5,544,347
[45] Date of Patent: Aug. 6, 1996

[54] DATA STORAGE SYSTEM CONTROLLED REMOTE DATA MIRRORING WITH RESPECTIVELY MAINTAINED DATA INDICES

[75] Inventors: Moshe Yanai, Framingham; Natan Vishlitzky, Brookline; Bruno Alterescu, Newton; Daniel Castel, Framingham; Gadi Shklarsky, Brookline, all of Mass.

[73] Assignee: EMC Corporation, Hopkinton, Mass.

[21] Appl. No.: 52,039

[22] Filed: Apr. 23, 1993

Related U.S. Application Data

[63] Continuation-in-part of Ser. No. 586,796, Sep. 24, 1990, Pat. No. 5,206,939, and a continuation-in-part of Ser. No. 587,247, Sep. 24, 1990, Pat. No. 5,269,011, and a continuation-in-part of Ser. No. 587,253, Sep. 24, 1990, Pat. No. 5,335,352.

[51] Int. Cl.⁶ ..................... G06F 12/16
[52] U.S. Cl. .............. 395/489; 395/182.04; 364/DIG. 1; 364/268.1; 364/268.3; 364/DIG. 2
[58] Field of Search ............... 364/200 MS File, 364/900 MS File; 371/10.1, 10.2, 40.1, 21.1; 395/575, 425, 488, 489, 182.03, 182.04

[56] References Cited

U.S. PATENT DOCUMENTS

| | | | |
|---|---|---|---|
| 3,588,839 | 6/1971 | Belady et al. | 395/469 |
| 3,835,260 | 9/1974 | Prescher et al. | 379/237 |
| 3,866,182 | 2/1975 | Yamada et al. | 340/172.5 |
| 4,020,466 | 4/1977 | Cordi et al. | 395/600 |
| 4,057,849 | 11/1977 | Ying et al. | 345/193 |
| 4,084,231 | 4/1978 | Capozzi et al. | 395/444 |
| 4,094,000 | 6/1978 | Brudevold | 345/200 |

(List continued on next page.)

FOREIGN PATENT DOCUMENTS

| | | |
|---|---|---|
| 0239323 | 9/1987 | European Pat. Off. . |
| 0323123 | 12/1988 | European Pat. Off. . |
| 57-111900 | 7/1982 | Japan . |
| 1-19437 | 1/1989 | Japan . |
| 1-19438 | 1/1989 | Japan . |
| 1-120650 | 5/1989 | Japan . |
| 2-32419 | 2/1990 | Japan . |

(List continued on next page.)

OTHER PUBLICATIONS

Hank Cote–New Horizons In Accessing Large Amounts of On–Line Data pp. 71–75, 1982.
Matt Kramer–Fault–Tolerant LANs Guard Against Malfunction, Data Loss pp. C26–C35, Sept. 1987.
Carol Grossman–Planning for 3990 Extended Functions pp. 245–258, 1989, 30th Annual GUIDE Conference.

(List continued on next page.)

*Primary Examiner*—Matthew M. Kim
*Attorney, Agent, or Firm*—Daniel J. Bourque; Kevin J. Carroll

[57] ABSTRACT

A data storage system which automatically provides and maintains identical secondary data on a preferably geographically remote secondary data storage device. The system includes a primary host computer located in the first geographic location which is coupled to a primary data storage system also located in the first geographic location. The primary data storage system includes at least one primary data storage device on which primary data is to be stored, and a primary data storage system controller which receives data from the primary host computer and controls the storing of the primary data on the primary data storage device. The primary data storage controller is coupled by high speed communication link to a secondary data storage system controller of a secondary data storage system, and coordinates the copying of the primary data to the secondary data storing system, and is responsive to an acknowledgement from the secondary data storage system controller of at least successful receipt of the primary data for updating the maintained list of the primary data to indicate that the copied primary data has been received by the secondary data storage system to be copied to the secondary data storage device.

13 Claims, 2 Drawing Sheets

U.S. PATENT DOCUMENTS

| | | | |
|---|---|---|---|
| 4,124,843 | 11/1978 | Bramson et al. | 340/337 |
| 4,150,429 | 4/1979 | Ying | 395/293 |
| 4,161,777 | 7/1979 | Behnase et al. | 395/481 |
| 4,204,251 | 5/1980 | Brudevold | 395/309 |
| 4,342,079 | 7/1982 | Stewart et al. | 395/405 |
| 4,396,984 | 8/1983 | Videki II | 395/858 |
| 4,430,727 | 2/1984 | Moore et al. | 395/442 |
| 4,453,215 | 6/1984 | Reid | 395/182.09 |
| 4,464,713 | 8/1984 | Benhase et al. | 395/415 |
| 4,577,272 | 3/1986 | Ballew et al. | 395/650 |
| 4,634,110 | 1/1987 | Julich et al. | 371/11 |
| 4,698,808 | 10/1987 | Ishii | 371/21.5 |
| 4,710,870 | 12/1987 | Blackwell et al. | 395/182.04 |
| 4,755,928 | 7/1988 | Johnson et al. | 395/182.04 |
| 4,769,764 | 9/1988 | Levanon | 361/680 |
| 4,779,189 | 10/1988 | Legvold et al. | 395/493 |
| 4,783,834 | 11/1988 | Anderson et al. | 382/245 |
| 4,785,472 | 11/1988 | Shapiro | 379/96 |
| 4,797,750 | 1/1989 | Karweit | 358/335 |
| 4,805,106 | 2/1989 | Pfeifer | 395/650 |
| 4,814,592 | 3/1989 | Bradt et al. | 235/381 |
| 4,837,680 | 6/1989 | Crockett et al. | 395/284 |
| 4,849,978 | 7/1989 | Dishon et al. | 395/182.04 |
| 4,862,411 | 8/1989 | Dishon et al. | 395/494 |
| 4,916,605 | 4/1990 | Beardsley et al. | 395/489 |
| 4,949,187 | 8/1990 | Cohen | 358/335 |
| 4,985,695 | 1/1991 | Wilkinson et al. | 340/571 |
| 5,007,053 | 4/1991 | Iyer et al. | 371/21.1 |
| 5,029,199 | 7/1991 | Jones et al. | 379/89 |
| 5,051,887 | 9/1991 | Berger et al. | 395/489 |
| 5,060,185 | 10/1991 | Naito et al. | 395/600 |
| 5,089,958 | 2/1992 | Horton et al. | 395/182.03 |
| 5,097,439 | 3/1992 | Partriquin et al. | 395/402 |
| 5,099,485 | 3/1992 | Bruckert et al. | 395/182.09 |
| 5,123,099 | 6/1992 | Shibata et al. | 395/447 |
| 5,127,048 | 6/1992 | Press et al. | 379/100 |
| 5,132,787 | 7/1992 | Omi et al. | 358/524 |
| 5,134,711 | 7/1992 | Asthana et al. | 395/800 |
| 5,146,576 | 9/1992 | Beardsley et al. | 395/440 |
| 5,146,605 | 9/1992 | Beukema et al. | 395/821 |
| 5,155,814 | 10/1992 | Beardsley et al. | 395/872 |
| 5,155,835 | 10/1992 | Belsan | 395/441 |
| 5,155,845 | 10/1992 | Beal et al. | 395/182.04 |
| 5,157,770 | 10/1992 | Beardsley et al. | 395/439 |
| 5,159,671 | 10/1992 | Iwami | 395/250 |
| 5,170,471 | 12/1992 | Bonevento et al. | 395/837 |
| 5,175,839 | 12/1992 | Ikeda et al. | 395/410 |
| 5,185,864 | 2/1993 | Bonevento et al. | 395/868 |
| 5,201,053 | 4/1993 | Benhase et al. | 395/289 |
| 5,202,887 | 4/1993 | Ueno et al. | 371/10.1 |
| 5,235,690 | 8/1993 | Beardsley et al. | 395/440 |
| 5,235,692 | 8/1993 | Ayres et al. | 395/849 |
| 5,239,659 | 8/1993 | Rudeseal et al. | 395/800 |
| 5,274,645 | 12/1993 | Idelman et al. | 395/182.04 |
| 5,313,664 | 5/1994 | Sugiyama et al. | 364/405 |
| 5,343,477 | 8/1994 | Yamada | 395/182.02 |
| 5,428,796 | 6/1995 | Iskiyan et al. | 395/728 |
| 5,446,872 | 8/1995 | Ayres et al. | 395/180 |
| 5,459,857 | 10/1995 | Ludlam et al. | 395/182.04 |
| 5,463,752 | 10/1995 | Behnase et al. | 395/481 |

FOREIGN PATENT DOCUMENTS

| | | |
|---|---|---|
| 2-32420 | 2/1990 | Japan . |
| 2-32418 | 2/1990 | Japan . |
| 2-91716 | 3/1990 | Japan . |
| 2-91717 | 3/1990 | Japan . |
| 2-93721 | 4/1990 | Japan . |
| 2086625 | 5/1992 | United Kingdom . |
| PCT/US/84/ 01678 | 7/1985 | WIPO . |
| PCT/US/93/ 05853 | 1/1994 | WIPO . |

OTHER PUBLICATIONS

Bob Buchanan–Administrative Error Causes Most Major System Failures (3 pgs.), Feb. 1988, Government Computer News, V. 17, N.4 p. 340.

Virginia Dudek–Planning For Network Disasters (4 pgs.), Jun. 12, 1989, MIS Week, vol. 10, N 24.

Jean Bozman–Escon An Aid To Remote Disks (3 pgs.), V 25, N 1, pp 29, Jan. 7, 1991.

Gary A. Boles–A RAID Stack: Micropolis RAIDION, Network Computer, Jun. 1992.

Blaine Homer–RAID Level 5 Protects Your Data With Interleaved Parity, LAN Times, May 25,1992, vol. 9.

Michael Caton–Micropolis Array Secures Data, PC Week, 1992.

RAIDON Fault–Tolerant Disk Arrays Brochure, 1993.

Storagetek 2Q earnings Down, Iceberg Ready for Testing by Jim Mallory, Newsbytes, Jul. 15, 1993.

Network Backup Evolves, by Michael Peterson et al, PC Magazine, vol. 12 No. 16, Sep. 28, 1993, p. 277(18).

Your Next LAN Storage Could Be a Mainframe, Jeff Moad, Datamination, vol. 39, No. 6, Mar. 15, 1993,p. 71.

Heard Any Good Rumors Lately?(Network Management), By Jill Huntington–Lee,LAN Computing, vol. 5, No. 2, Feb. 1994,p. 22.

Special Report: The AT&T Worldwide Intelligent Network –Scope, Nature and Management, Edge, vol. 7. No. 224, Nov. 6, 1992, p. 9.

Protect Your Data!(Database Report), by Michael Liczbanski, Data Based Advisor, vol. 10, No. 5, May 1992, p.114.

Network Planning to the Rescue; Network Managers Should Design and Test A Network Recovery Plan That Lets Business Continue Uninterrupted Even If Disaster Strikes, by Ramond W. Rudnitskas et al., Networking Management, vol. 9, No. 11, Oct. 1991, p. 46.

If LANS Eye Host Status, Quality Today Falls Short, by Barbara Bochenski, Software Magazine, vol. 11, No. 12, Oct. 1991, p. 66

Safe and Secure, by Peter Stephenson, LAN Magazine, vol. 6, No. 9, Sep. 1991, p. 34.

Firing Up Fault Tolerance by Brian O'Connell, DEC Professional vol. 10, No. 6, Jun 1991, p. 118.

A Which Computer?Guide to Backup Systems, by Chris Bidmead, Which Computer?Sep. 1989, p. 62.

Optical Disks Compete With Videotape and Magnetic Storage Media, by Henry Urrows et al., Optical Information Systems, vol. 8, No. 3,May–Jun. 1988, p. 101.

Preventing Disasters: Whipping Up an Emergency Response Plan, Network Computing, Feb. 1992 p. 81.

Abbey Banking on FDDI, Communications Week International, Mar. 4, 1991 p. 22.

X.25 Data Networks and IBM: A Troublesom Connection, by Jan Johnson, Computer Decisions, vol. 19, Jan. 12, 1987, p. 16.

DSC Communications Corp. Debuts NEXOS LAN Product Line at Interface, Demos Enhanced Performance, Fault Tolerance and WAN Connectivity, News Release, Mar. 28, 1988.

Analysis of Scanning Policies For Reducing Disk Seek Times, by E. G. Coffman, L. A. Klimko and Barbara Ryan–Siam Journal on Computing Sep. 1972, vol. 1, No. 3, pp. 269–280.

Configuring Tandem Disk Subsystems, by Scott Sitler, Tandem Systems Review, Dec. 1986 pp. 80–91.

Technical Report Investigation of Selected Disk Systems, Oct. 1976 Teledyne Brown Engineering, Huntsville, Alabama (18 pages).

Software Extends Unix Distributed Computing, by Evan O. Grossman, PC Week, Jun. 5, 1989, p.35 and p. 40.

IBM Funds Pack Firm, Electronic News, May 22, 1989. pp. 12.

IBM Plans U.S. Test of File–Transfer, Network World, Sep. 5, 1988, pp. 15, 17.

IBM Invests In Firm That Offers Unix File–Sharing, Network World, May 22, 1989, p.4.

IBM Plans Speedy Nationwide File System, Computer Systems News, Sep. 5, 1988, p.56.

Design Alternatives for Disk Duplexing, by Spencer W. Ng, IBM Research Repott, Jan. 30, 1987.

Disk Arm Movement In Anticpation of Future Requests, by Richard P. King, IBM Rsearch Report, Dec. 16, 1987.

Ubik: Replicated Servers Made Easy, by Michael Leon Kazar pp. 60–67, 1989.

Carnegie–Mellon Forges Standard Look For Multivendor Net, Computerworld, Jan. 30, 1989 pp. SR/8–SR/9.

A Multi–media Message System For Andrew, USENIX Winter Conference, Feb. 9–12, 1988, pp.37–42.

Synchronization and Caching Issues in the Andrew File System, USENIX Winter Conference, Feb. 9–12, 1988,pp. 27–36.

Comparative Study of Some UNIX Distributed Filesystems, EUUG, Sep. 22–24, 1986, pp. 73–82.

VOLUMES–The Andrew File System Data Structuring Primitive, EUUG Autumn 1986, Sep. 22–24, 1986, pp. 473–480.

Unix Plays Role in Corporate Networking, MIS Week, vol. 10, No. 28, Jul. 17, 1989, pp. 22–23.

Sun's Open System Made by marketplace;"Unlike Minis, Unix Machines, Pcs and Even VMS Can Be Glued"by NFS, Software Magazine, vol. 9, No. 12, Oct. 1989 pp. 72–75. Cashin, Jerry.

Universal Server Under Development, MacWEEK, Vol. 3,No. 39, Oct. 31 1989, p. 5.

Unix Plays Role In Corporate Networking–Vendors Look Unx–Based Network Management Tools as Networking Standards Slowly Evolve, MIS Week, Jul. 17,1989, pp. 22–23, vol. 10, N.28.

The 28 Runners Declared for Open Software Foundations, Distributed Computing Stakes, Computergram International No. 1301, CGI11909912, Nov. 9, 1989.

Some Platforms (Theory of Self–Organizing Systems), RELease 1.0,vol. 89, No. 6, Jun. 27, 1989, pp. 12–16, Release 1, v89,n6.

Self–Organizing Systems (Overview of Detailed Examples of Self–Organizing Systems, Includes related article About the Importance of Self–Organizing Systems, RELease 1.0, vol. 89, No. 6, Jun. 27, 1989, pp.1–9.

IBM–Funded Startup Developing Unix Add–On, PC Week, vol. 6, No. 22, Jun. 5, 1989, p.40.

Uniting File Systems; Experimental large Scale, Distributed File Systems Are Now Being Created (included related article on the History of the AFS Project),UNIX Review, vol. 7, No. 3, Mar. 1989, pp.61–70.

IBM Backs Transarc, Formed to Offer Andrew File System Distributed Unix Database, Computergram International, No. 1180, CGI05190001, May 19, 1989.

A Comparative Analysis of Disk Scheduleing Policies, by Toby J. Reorey and Tad B. Pinerton–Communications of the ACM, Mar. 1972 vol. 15, No. 3 pp. 177–184.

Disk Scheduling: FCFS vs. SSTF Revisited, by Micha Hofri–Communications of the ACM Nov. 1980, vol. 23, No. 11, pp.645–653.

Using Multiple Replica Classes to Improve Performance in Distributed System, by Peter Triantafillou and David Tayloer, The 11th International Conference on Distributed Computing Systems, May 20–24, 1991, pp. 420–428.

Government Computer News Oct. 9, 1987.Richard A. Damca, *Microcomputing* "Patch Fault Tolerance: A Strong Second Team" vol. 7, issue 149 P27(2) Dec. 17, 1990.

Computer ResellerN Feb. 19, 1990, Joel Shore *Mirrored Servers' a reality?;* pp. 51.52, 62.

Infoworld Articles Mar. 12, 1990, *Vendors Offer Mirroring Solutions* P(31).

Wilkinson, *Compact and Novell team for fault tolerance: mirrored servers to cut down on costly downtime* Article MIS Week, vol. 11, Issue 7 Feb. 12, 1990.

Article PC Week, vol. 4, Issue 37, Sep. 15, 1987, Matt Kramer *Fault–Tolerant LANS Guard Against Malfunction, Data Loss.*

"The DASD Time Bomb", Datamation, vol. 32 Mar. 1, 1986, P63(4) Alper, Alan.

DATA STORAGE SYSTEM CONTROLLED REMOTE DATA MIRRORING WITH RESPECTIVELY MAINTAINED DATA INDICES

RELATED APPLICATION

This application is a continuation-in-part of U.S. Pat. Ser. Nos. 586,796, filed Sep. 24, 1990, now U.S. Pat. No. 5,206,939 issued Apr. 27, 1993 entitled SYSTEM AND METHOD FOR DISK MAPPING AND DATA RETRIEVAL; Ser. No. 587,247, filed Sep. 24, 1990, now U.S. Pat. No. 5,269,011 issued Dec. 7, 1993 entitled DYNAMICALLY RECONFIGURABLE DATA STORAGE SYSTEM WITH STORAGE SYSTEM CONTROLLERS SELECTIVELY OPERABLE AS CHANNEL ADAPTERS ON STORAGE DEVICE ADAPTERS and Ser. No. 587,253, filed Sep. 24, 1990, now U.S. Pat. No. 5,335,352 issued Aug. 2, 1994 entitled RECONFIGURABLE, MULTI-FUNCTION DATA STORAGE SYSTEM CONTROLLER SELECTIVELY OPERABLE AS AN INPUT CHANNEL ADAPTER AND A DATA STORAGE UNIT ADAPTER all of which are fully incorporated herein by reference.

FIELD OF THE INVENTION

This invention relates to data storage on disk drives and more particularly, to a system and method for automatically providing and maintaining a copy or mirror of a data storage disk at a location geographically remote from the main or primary data storage device.

BACKGROUND OF THE INVENTION

Nearly all data processing system users are concerned with maintaining back-up data in order to insure continued data processing operations should their data become lost, damaged, or unavailable.

Large institutional users of data processing systems which maintain large volumes of data such as banks, insurance companies, and stock market traders must and do take tremendous steps to insure back up data availability in case of a major disaster.

These institutions recently have developed a heightened awareness of the importance of data recovery and back-up in view of the many natural disasters and other world events including the recent bombing of the World Trade Center in New York City.

Currently, data processing system users often maintain copies of their valuable data on site on either removable storage media, or in a secondary "mirrored" storage device located on or within the same physical confines of the main storage device. Should a disaster such as fire, flood, or inaccessibility to a building occur, however, both the primary as well as the secondary or backed up data will be unavailable to the user. Accordingly, more data processing system users are requiring the remote storage of back up data.

One prior art approach at data back-up involves taking the processor out of service while back-up tapes are made. These tapes are then carried off premises for storage purposes. Should access to the backed up data be required, the proper tape must be located, loaded onto a tape drive, and restored to the host system requiring access to the data. This process is very time consuming and cost intensive, both in maintaining an accurate catalog of the data stored on each individual tape, as well as storing the large number of tapes required to store the large amounts of data required by these institutions. Additionally and most importantly, it often takes 24 hours before a back-up tape reaches its' storage destination during which time the back-up data is unavailable to the user.

Additionally, today's systems require a significant amount of planning and testing in order to design a data recovery procedure and assign data recovery responsibilities. Typically, a disaster recovery team must travel to the test site carrying a large number of data tapes. The team then loads the data onto disks, makes the required network connections, and then restores the data to the "test" point of failure so processing can begin Such testing may take days or even weeks and always involves significant human resources in a disaster recovery center or back-up site.

Some providers of prior art data storage systems have proposed a method of data mirroring whereby one host Central Processing Unit (CPU) or processor writes data to both a primary, as well as a secondary, data storage device or system. Such a proposed method, however, overly burdens the host CPU with the task of writing the data to a secondary storage system and thus dramatically impacts and reduces system performance.

Accordingly, what is required is a data processing system which automatically and asynchronously, with respect to a first host system, generates and maintains a back-up or "mirrored" copy of a primary storage device at a location physically remote from the primary storage device, without intervention from the host which seriously degrades the performance of the data transfer link between the primary host computer and the primary storage device.

SUMMARY OF THE INVENTION

This invention features a system which automatically, without intervention from a host computer system, controls storing of primary data received from a primary host computer on a primary data storage system, and additionally controls the copying of the primary data to a secondary data storage system controller which forms part of a secondary data storage system, for providing a back-up copy of the primary data on the secondary data storage system which is located in a geographically remote location from the primary data storage system.

In the present invention, copying or mirroring of data from a primary data storage system to a secondary data storage system is accomplished without intervention of a primary or secondary host computer and thus, without affecting performance of a primary or secondary host computer system. In the present invention, primary and secondary data storage system controllers are coupled via at least one high speed communication link such as a fiber optic link driven by LED's or laser.

At least one of the primary and secondary data storage system controllers coordinates the copying of primary data to the secondary data storage system and at least one of the primary and secondary data storage system controllers maintains at least a list of primary data which is to be copied to the secondary data storage device.

Additionally, the secondary data storage system controller provides an indication or acknowledgement to the primary data storage system controller that the primary data to be copied to the secondary data storage system in identical form as secondary data has been received or, in another embodiment, has actually been written to a secondary data storage device.

Accordingly, data may be transferred between the primary and secondary data storage system controllers synchronously, when a primary host computer requests writing of data to a primary data storage device, or asynchronously with the primary host computer requesting the writing of data to the primary data storage system, in which case the remote data copying or mirroring is completely independent of and transparent to the host computer system.

At least one of the primary data storage system controller and the secondary data storage system controller maintains a list of primary data which is to be written to the secondary data storage system. Once the primary data has been at least received or optionally stored on the secondary data storage system, the secondary data storage system controller provides an indication or acknowledgement of receipt or completed write operation to the primary data storage system.

At such time, the primary and/or secondary data storage system controller maintaining the list of primary data to be copied updates this list to reflect that the given primary data has been received by and/or copied to the secondary data storage system. The primary or secondary data storage system controllers and/or the primary and secondary data storage devices may also maintain additional lists in concluding which individual storage locations, such as tracks on a disk drive, are invalid on any given data storage device, which data storage locations are pending a format operation, which data storage device is ready to receive data, and whether or not any of the primary or secondary data storage devices are disabled for write operations.

Thus, an autonomous, host computer independent, geographically remote data storage system is maintained providing a system which achieves nearly 100 percent data integrity by assuring that all data is copied to a geographically remote site, and in those cases when a back-up copy is not made due to an error of any sort, an indication is stored that the data has not been copied, but instead must be updated at a future time.

Such a system is provided which is generally lower in cost and requires substantially less manpower and facilities to achieve than the prior art devices.

BRIEF DESCRIPTION OF THE DRAWINGS

These and other features and advantages of the present invention will be better understood when read together with the following drawings wherein:

FIG. 2 is a schematic representation of a portion of an index or list maintained by the system of the present invention to determine various features including which primary data has been copied to a secondary disk; and FIG. 3 is a schematic representation of an additional list or index maintained by the system of the present invention to keep track of additional items including an invalid data storage device track, device ready status and write disable device status.

DETAILED DESCRIPTION OF THE INVENTION

Figure 1:
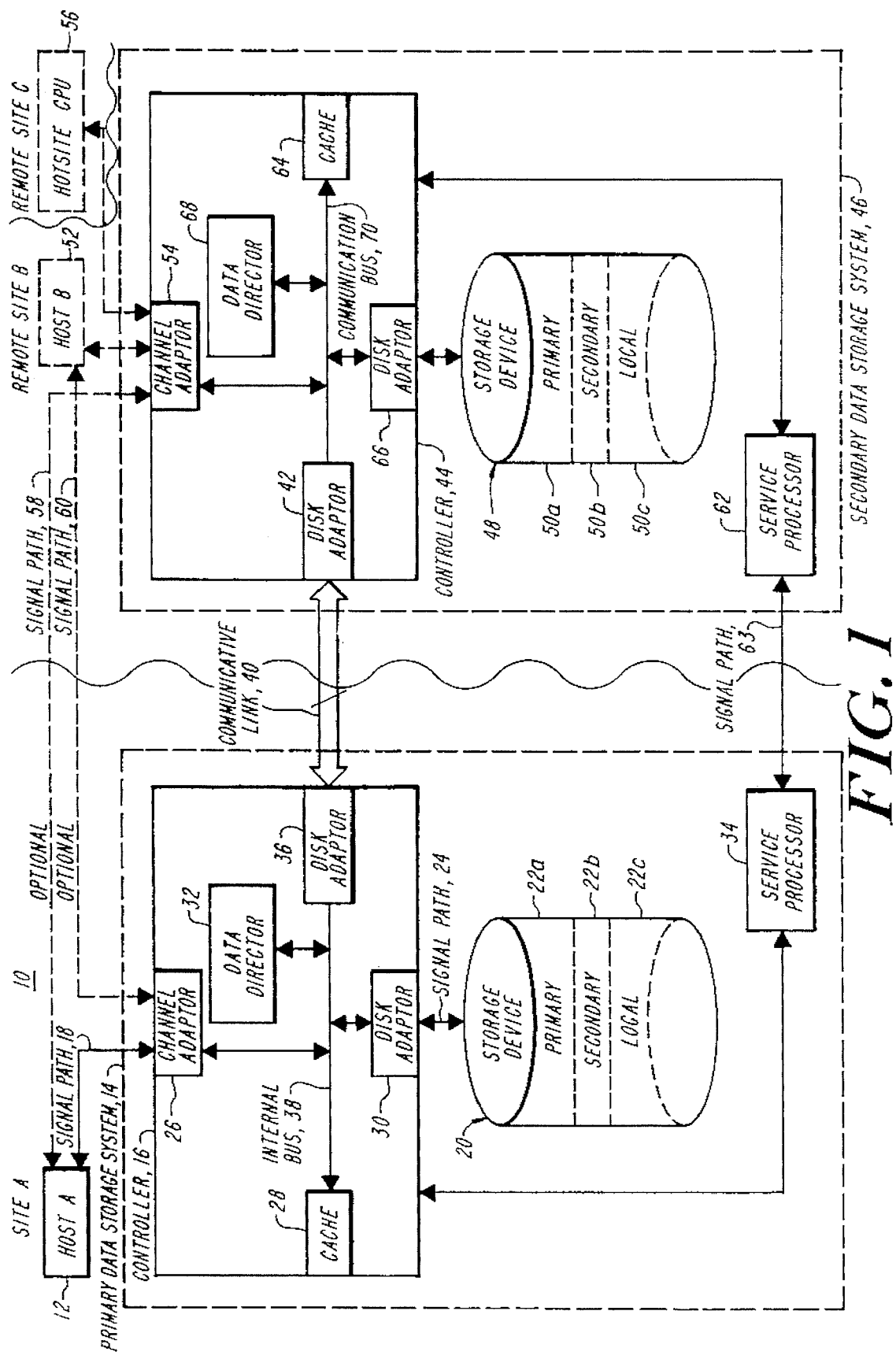
FIG. 1 is a block diagram illustrating the system with remote data mirroring according to the present invention.

The present invention features a system which provides a geographically remote mirrored data storage system which contains generally identical information to that stored on a primary data storage system. Utilizing such a system, data recovery after a disaster is nearly instantaneous and requires little, if any, human intervention. Using the present system, the data is retrieved from a remote device through the host data processing system.

The present invention is shown generally at 10, FIG. 1, and includes at site A, which is a first geographic location, a host computer system 12 as is well known to those skilled in the art. A host computer system 12 is coupled to a first and primary data storage system 14. The host 12 writes data to and reads data from the primary data storage system 14.

The primary data storage system 14 includes a primary data storage system controller 16 which receives data from the host 12 over data signal path 18. The primary data storage system controller 16 is also coupled to a storage device 20 which may include a plurality of data storage devices 22a–22c. The storage devices may include disk drives, optical disks, CD's or other data storage device. The primary system controller 16 is coupled to the storage device 20 by means of data signal path 24.

The primary data storage system controller 16 includes at least 1 channel adapter (C.A.) 26 which is well known to those skilled in the art and interfaces with host processing system 12. Data received from the host is typically stored in cache 28 before being transferred through disk adapter (D.A.) 30 over data signal path 24 to the primary storage device 20. The primary data storage controller 16 also includes a data director 32 which executes 1 or more sets of predetermined micro-code to control data transfer between the host 12, cache memory 28, and the storage device 20. Although the data director is shown as a separate unit, either one of a channel adapter 26 or disk adapter 30 may be operative as a data director, to control the operation of a given data storage system controller. Such a reconfigurable channel adapter and disk adapter is disclosed in Applicant's U.S. Pat. No. 5,335,352 entitled RECONFIGURABLE, MULTI-FUNCTION DATA STORAGE SYSTEM CONTROLLER SELECTIVELY OPERABLE AS AN INPUT CHANNEL ADAPTER AND A DATA STORAGE UNIT ADAPTER of which the present Application is a continuation in part, and which is fully incorporated herein by reference.

The primary data storage system 14 according to one embodiment of the present invention also includes a service processor 34 coupled to the primary data storage system controller 16, and which provides additional features such as monitoring, repair, service, or status access to the storage system controller 16.

The primary data storage system controller 16 of the present invention also features at least a second disk adapter 36 coupled to the internal bus 38 of the primary data processing system controller 16. The at least second disk adapter 36 is coupled, via a high speed communication link 40 to disk adapter 42 on a secondary data storage system controller 44 of a secondary data storage system 46. Such high speed, point-to-point communication links between the primary and secondary data processing system controllers 16 and 44 include a fiber optic link driven by an LED driver, per IBM ESCON standard; a fiber optic link driven by a laser driver, and optionally T1 and T3 telecommunication links. Utilizing network connections, the primary and secondary data storage system controller 16 and 44 may be connected to FDDI networks, T1 or T3 based networks and SONET networks.

The secondary data storage system 46 is located a second site geographically removed from the first site. For this Patent Application, geographically removed site means not within the same building as the primary data storage system. There are presently known data processing systems which provide data mirroring to physically different data storage systems. The systems, however, are generally within the same building. The present invention is directed to providing complete data recovery in case of disaster, such as when a natural disaster such as a flood or a hurricane, or man made disasters such as fires or bombings destroy one physical location, such as one building.

As in the case of the primary data storage system, the secondary data storage system 46 includes, in addition to the secondary data storage system controller 44, a secondary data storage device 48 including a plurality of storage devices 50a–50c. The plurality of storage devices on the secondary data storage system 46, as well as the primary data storage system 14, may have various volumes and usages such as a primary data storage device 50a which is primary in respect to the attached storage controller 44 and host 52 in the case of the secondary data storage system 46, or primary storage device 22a with respect to the first or primary host 12.

Additionally, each storage device such as storage device 48 may include a secondary storage volume 50b which serves the secondary storage for the primary data stored on the primary volume 22a of the primary data storage system 14. Similarly, the primary data storage system 14 may include a secondary storage volume 22b which stores primary data received and copied from a secondary site and data processing system 46 and host 52.

Additionally, each storage device 20, 48, may include one or more local volumes or storage devices 22c, 50c, which are accessed only by their locally connected data processing systems.

The secondary storage system controller 44 of the present invention also includes at least a first channel adapter 54 which may receive data from an optionally connected secondary host 52 or an optionally connected hotsite host or CPU 56. Optionally, the primary host 12 may include a data signal path 58 directly into the channel adapter 54 of the secondary data storage system 46, while the optional secondary host 52 may include an optional data path 60 into the channel adapter 26 of the primary data storage system 14. Although the secondary host 52 illustrated in the Fig. is not required for remote data mirroring as described in the present invention, such a host would be required for data retrieval if both the primary host 12 as well as the primary data storage system 14 are rendered inoperative. Similarly, a hotsite host or CPU 56 may optionally be provided at a third geographically remote site to access the data stored in the secondary data storage system 46.

The high speed link 40 between the primary and secondary data storage systems 14 and 46 is designed such that multiple links between the primary and secondary storage system may be maintained for enhanced ability of data and increased system performance. The number of links is variable and may be field upgradeable. Additionally, service processor 34 of the primary data storage system 14 and service processor 62 of the secondary data storage system 46 may also be coupled to provide for remote system configuration, remote software programming and to provide a host base point of control of the secondary data storage system.

The secondary data storage system controller 44 also includes cache memory 64 which receives data from channel adapter 54 and disk adapter 42, as well as disk adapter 66 which controls writing data to and from secondary storage device 48. Also provided is a data director 68 which controls data transfer over communication bus 70 to which all the elements of the secondary data storage system controller are coupled.

An additional feature of the present invention is the ability to dynamically reconfigure channel adapters as disk adapters and disk adapters as channel adapters, as described in Applicant's U.S. Pat. No. 5,269,011 entitled DYNAMICALLY RECONFIGURABLE DATA STORAGE SYSTEM of which the present Application is a continuation in part, and which is fully incorporated herein by reference.

The primary and secondary data storage systems may optionally be connected by means of currently available, off the shelf channel extender equipment using bus and tag or escon interfaces.

The present invention is designed to provide the copying of data from a primary data storage system to a physically remote secondary data storage system transparent to the user, and external from any influence of the primary host which is coupled to the primary data storage system. The present invention is designed to operate in at least two modes, the first being a real-time mode wherein the primary and secondary storage systems must guarantee that the data exists and is stored in 2 physically separate data storage units before i/o completion. That is, before channel end and device end is returned to the host. Alternatively, the present invention is designed to operate in point-in-time mode wherein the data is copied to the remote or secondary data storage system asynchronously from the time when the primary or local data processing system returns the i/o completion signal (channel end and device end) to the primary host systems. This eliminates any performance penalty if the communication link between the primary and secondary data storage systems is too slow, but creates the additional needs to manage the situation where data is not identical or in "sync" between the primary and secondary data storage systems.

Thus, in the real time mode, the primary data storage system automatically controls the duplication or copying of data to the secondary data storage system controller transparently to the primary host computer. Only after data is safely stored in both the primary and secondary data storage system, as detected by an acknowledgement from the secondary storage system to the primary storage system, does the primary data storage system acknowledged to the primary host computer that the data is synchronized. Should a disaster or facility outage occur at the primary data storage system site, the user will simply need to initialize the application program in the secondary data storage system utilizing a local host (52) or a commercial hotsite CPU or host 56.

The link between the primary and secondary storage system controllers 14 and 46 may be maintained in a uni-directional mode wherein the primary data storage system controller monitors and controls data copying or mirroring. Alternatively, a bi-directional implementation is disclosed in the present invention wherein either controller can duplicate data to the other controller, transparently to the host computer. Should a disaster or facilities outage occur, recovery can be automatic with no human intervention since the operational host computer already has an active path (40, 58, 60) to the data through its' local controller. While offering uninterrupted recovery, performance will be slower than in an uni-directional implementation due to the over head required to manage intercontroller tasks.

In the second point mode of operation the primary data storage system transparently duplicates data to the secondary data storage system after the primary data storage system acknowledges to the host computer, via channel end and device end, that the data has been written to the storage device and the i/o operation has been completed. This eliminates the performance impact of data mirroring over long distances. Since primary and secondary data are not synchronized, however, the primary data storage system must maintain a log file of pending data which has yet to be written to the secondary data storage device. Such data may be kept on removable, non-volatile media, in the cache memory of the primary or secondary data storage system controller as will be explained below, or in the service processor 34, 62.

Accordingly, a feature of the present invention is the ability of a data storage system to control the transfer or copying of data from a primary data storage system to the secondary data storage system, independent of and without intervention from one or more host computers. Most importantly, in order to achieve optimum data mirroring performance, such data mirroring or copying should be performed asynchronously with input/output (i/o) requests from a host computer. Accordingly, since data will not be immediately synchronized between the primary and secondary data storage systems, data integrity must be maintained by maintaining an index or list of various criteria including a list of data which has not been mirrored or copied, data storage locations for which a reformat operation is pending, a list of invalid data storage device locations or tracks, whether a given device is ready, or whether a device is write-disabled. Information must also be included as to the time of the last operation so that the data may later be synchronized should an error be detected.

A feature of the present invention is that both the primary or secondary data storage systems maintain a table of the validity of data in the other storage system. As disclosed in co-pending U.S. patent application No. 07/586,796 entitled A SYSTEM AND METHOD FOR DISK MAPPING AND DATA RETRIEVAL of which the present Application is a continuation in part and which is fully incorporated herein by reference, the present system maintains a list or index, utilizing one or more flag bits, in a hierarchical structure, on each physical and logical data storage device.

In the present invention, however such information is kept on both devices for each individual system as well as the other data storage system. Thus, as illustrated in the partial list or table 100, FIG. 2, each data storage system maintains an indication of write or copy pending 102 of both the primary data (M1) 104, and the secondary data (M2) 106. Similarly, an index is maintained of a pending format change since a disk format change may be accomplished. The format pending bits 108 including a first primary bit 110 and a second secondary bit 112 indicate that a format change has been requested and such change must be made on the disk.

Thus, when a host computer writes data to a primary data storage system, it sets both the primary and secondary bits 104, 106 of the write pending bits 102 when data is written to cache. For these examples, the M1 bit will refer to the primary data storage system and the M2 refer to the secondary data storage system. When the primary data storage system controller disk adapter writes the data to the primary data storage device, it will reset bit 104 of the write pending indicator bits 102. Similarly, once the secondary data storage system has written the data to the secondary data storage device, the secondary data storage write pending indicator bit 106 will be reset.

The service processors in one embodiment of the present invention will periodically scan the index table for write pending indicator bits and invoke a copy task which copies the data from the primary data storage device to the secondary. In addition, one or more of the spare index or table bits 114, 116 may be utilized to store other data such as time stamp, etc.

Figures 2, 3:
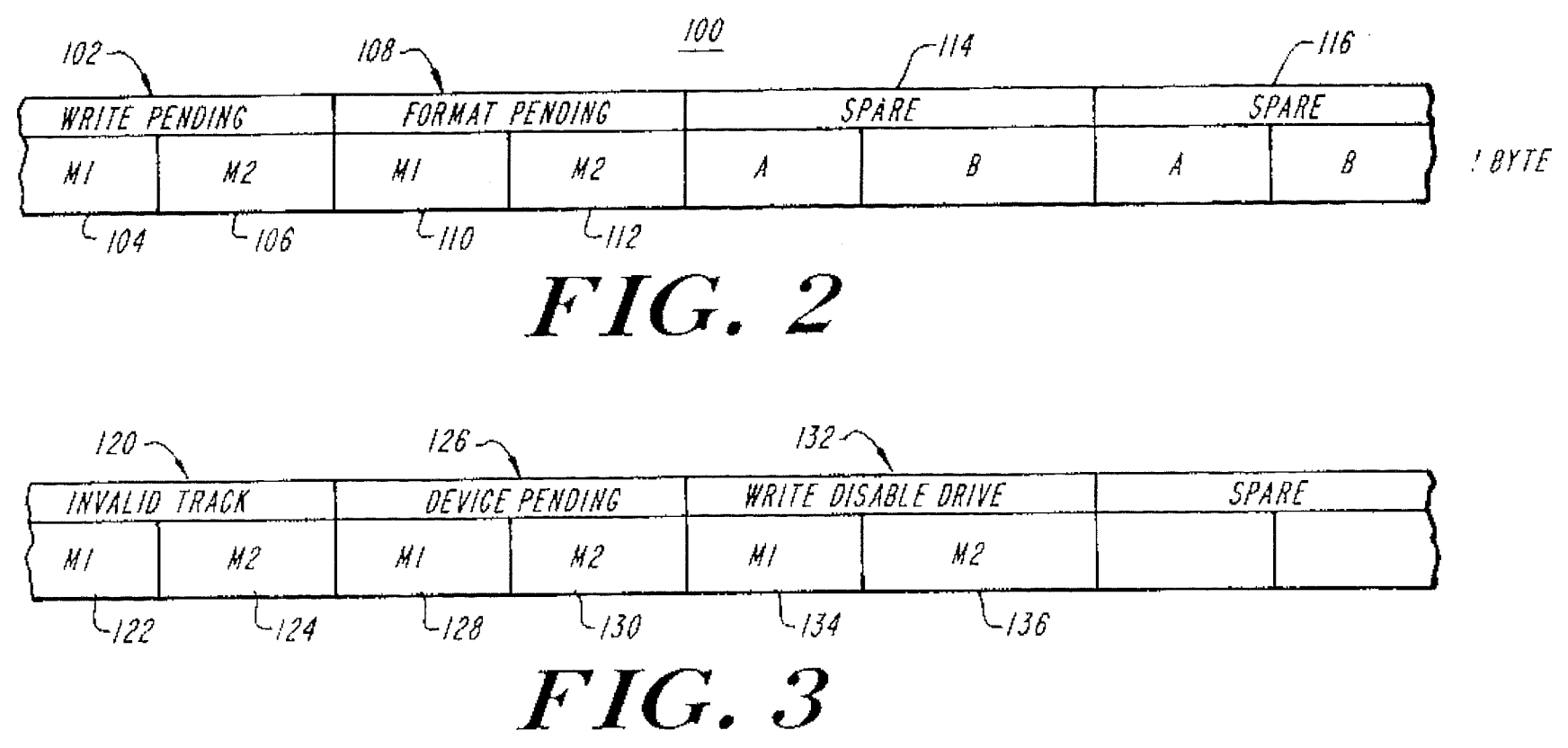

In addition to the write pending and format pending bits described above, the present invention also includes several additional general purpose flags to assist in error recovery. As shown in FIG. 3, invalid track flags 120 including primary bit 122 and secondary bit 124 are utilized and maintain on each data storage device to indicate that the data storage location such as a track, does not contain valid data. Another background task running on the data storage system such as in the service processor or storage system controller constantly checks invalid track bits on each data storage device and if a bit is found to be set, the copy task is invoked to copy the data from the known good device to the device with the invalid flag track set. Additional flags may be provided such as the device ready flags 126 including bits 128 and 130 which serve to indicate that the device is ready. Similarly, write disable flags 132 may be provided which indicate that a particular primary device or drive 134 or secondary device or drive 136 can presently not be written to. Data can still be copied to the good or enabled drive then later copied to the disabled drive. If one drive or device is bad, the present invention will set all tracks of that drive as not valid to later cause a copy of all the data.

Accordingly, each data storage device keeps data validity information about it's mirrored device. If for some reason a device is not accessible, either the primary or the secondary device, every new write command goes to the accessible mirrored device along with information that the not accessible device has a track which is not valid. As soon as the non-accessible device becomes accessible than automatically, as a background operation, the drives re-synchronize. In the case when a specific track is not shown on both the primary and secondary storage system, an indication of such will be assigned and the user will be alerted. A utility operating on the service processors will give the user a report of all the non-valid (out of sync) tracks. This report can be transferred from one site to another over the link 63, FIG. 1, that connects the 2 service processors 34, 62.

Modifications and substitutions by one of ordinary skill in the art are considered to be within the scope of the present invention, which is not to be limited except by the claims which follow.

We claim:

1. A system for automatically providing and maintaining data, said system comprising:

a host computer located in a first geographic location;

a first data storage system located in a first geographic location and coupled to said host computer, for storing data to be accessed by at least said host computer;

a second data storage system located in a second geographic location geographically remote from said first location, coupled to said first data storage system, for receiving at least data from said first data storage system; and said first data storage system enabling transfer of said data to said second data storage system, concurrently with said data received from said host computer, so as to nearly simultaneously maintain a concurrent copy of data stored on said first data storage system and on said second data storage system wherein both said first and said second data storage systems maintain an index, said index including at least a first indicator providing an indication of whether a predetermined data element stored on said first data storage system is valid, and at least a second indicator providing an indication of whether said predetermined data element stored on said second data storage system is valid.

2. The system of claim 1, wherein said first data storage system and said second data storage system are coupled by a high speed communication link.

3. The system of claim 1, wherein said second data storage system provides an acknowledgment after said data has been received and stored on said secondary data storage system.

4. The system of claim 1, further including a second host computer, located in said second geographic location geographically remote from said first location, and coupled to at least said second data storage system, for storing a second quantity of data to be accessed by at least said second host computer, and for at least retrieving said data stored on said second data storage system and copied from said data on said first data storage system upon failure of said first host and said first data storage system.

5. The system of claim 1, wherein said second data storage system maintains an index of at least data which has yet to be copied to said second data storage system as secondary data.

6. The system of claim 5, wherein said first and said second data storage systems maintain said index in semiconductor memory.

7. The system of claim 5, wherein said first and said second data storage systems maintain said index in said first and said second data storage system respectively.

8. The system of claim 5, wherein said maintained index includes at least a list of data which must be copied from said first data storage storage to said second storage system and, a list of data storage device storage locations for which a format command is pending and for which an invalid track exists.

9. The system of claim 1 wherein said first indicator provides an indication of whether data stored in a predetermined data element storage location on said first data storage system is valid, and wherein said second indicator provides an indication of whether corresponding data stored in a corresponding data element storage location on said second data storage system is valid.

10. A system for automatically providing and maintaining data, said system comprising:

a host computer;

a first data storage system including at least a first data storage system controller and at least one data storage device, said first data storage system coupled to said host computer, for storing data to be accessed by at least said host computer;

a second data storage system including at least a second data storage system controller and at least one data storage device, said second data storage system remotely coupled to said first data storage system; and said first data storage system controller coordinating and controlling concurrent copying of said data to said second data storage system controller wherein both said first and said second data storage systems maintain an index, said index including at least a first indicator providing an indication of whether a predetermined data element stored on said first data storage system is valid, and at least a second indicator providing an indication of whether said predetermined data element stored said second data storage system is valid.

11. The system of claim 10 wherein said first indicator provides an indication of whether data stored in a predetermined data element storage location on said first data storage system is valid, and second indicator provides an indication of whether corresponding data stored in a corresponding data element storage location on said second data storage system is valid.

12. A system for automatically providing and maintaining data, said system comprising:

at least one host computer located in a first location;

a first data storage system including a first data storage system controller and at least one data storage device, said first data storage system located in a first location and coupled to said host computer, for storing data to be accessed by at least said host computer;

a second data storage system including a second data storage system controller and at least one data storage device, said second data storage system located in a second location which is geographically remote from said first data storage system; and said first data storage system controller of said first data storage system and said second data storage system controller of said second data storage system for coordinating and controlling concurrent copying of said data from said first data storage system to said second data storage system wherein both said first and said second data storage systems maintain an index, said index including at least a first indicator providing an indication of whether a predetermined data element stored on said first data storage system is valid, and at least a second indicator providing an indication of whether said predetermined data element stored on said second data storage system is valid.

13. The system of claim 12 wherein first indicator provides an indication of whether data stored in a predetermined data element storage location on said first data storage system is valid, and second indicator provides an indication of whether corresponding data stored in a corresponding data element storage location on said second data storage system is valid.

* * * * *